Aug. 12, 1969 H. P. LOCHNER ET AL 3,461,004

METHOD OF EPITAXIALLY GROWING LAYERS
OF SEMICONDUCTING COMPOUNDS

Filed Aug. 3, 1966

United States Patent Office 3,461,004
Patented Aug. 12, 1969

3,461,004

METHOD OF EPITAXIALLY GROWING LAYERS OF SEMICONDUCTING COMPOUNDS

Horst P. Lochner, Bayreuth, and Hans Jurgen Dersin, Ottobrunn, Germany, assignors to Siemens Aktiengesellschaft, a corporation of Germany Filed Aug. 3, 1966, Ser. No. 570,010
Claims priority, application Germany, Aug. 5, 1965, S 98,675
Int. Cl. H01l 7/36
U.S. Cl. 148—175 17 Claims Our invention relates to a method of producing epitaxially grown layers of semiconducting compounds, particularly $A^{III}B^{V}$ compounds, of stoichiometric composition by means of a chemical transport reaction. In a more particular aspect, the invention relates to the production of compounds whose respective components have considerably different vapor pressures.

Figure 1:
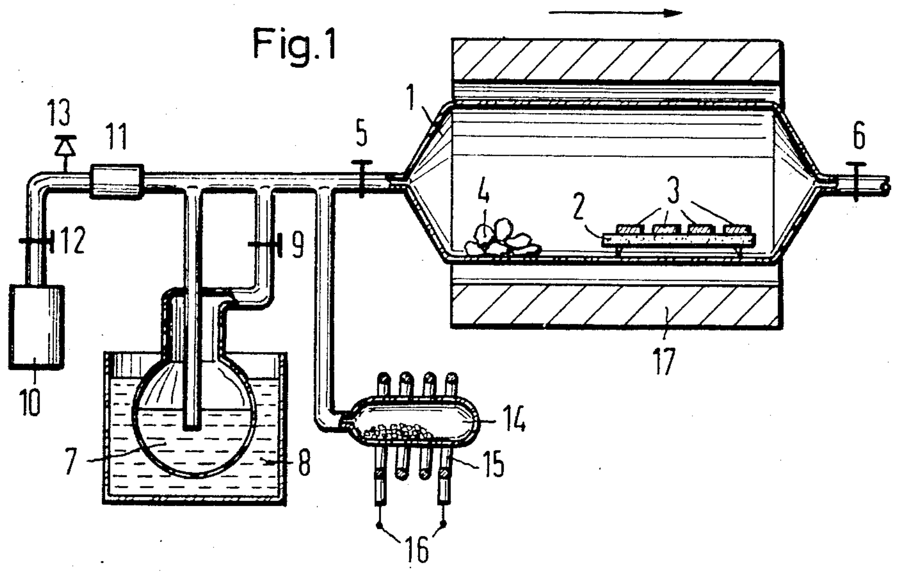

The known methods for producing semiconducting compounds or growing epitaxial layers from such compounds on substrates leave much to be desired. For example, when a semiconductor compound is produced by melting its components together, the fact that the vapor pressures of the respective components differ from each other, in some cases by several atmospheres, is highly aggravating. An accurately stoichiometric composition, required of such semiconductor compounds in epitaxially grown layers for electronic semiconductor devices, can be attained only by difficult expedients involving considerable cost. Departures from the stoichiometric composition, however, cause undesired doping effects which are not accurately controllable.

These disadvantages can be moderated by producing the semiconductor compounds from the gaseous phase. A subsequent conversion to the monocrystalline constitution can then be effected with the aid of a chemical transport reaction. It has been proposed to control the transport reaction in such a manner as to promote the formation of dendrites in the reaction vessel. The dendrites can be subsequently thickened by epitaxial growth caused by correspondingly changing the reaction condition. However, even this method encounters difficulties if one of the components of the semiconducting compound has a considerably higher vapor pressure than the other. This is because under such conditions there occurs a shift in composition similar to that observed when producing semiconductor compounds from molten components. That is, the stoichiometric composition cannot be accurately secured. Hence substantially the same disadvantages occur as with the production from the liquid phase.

It is an object of our invention to avoid such disadvantages and to reliably secure the production or epitaxial growth of semiconducting compounds from the gaseous phase in conjunction with a chemical transport reaction.

To this end, and in accordance with a feature of our invention, we add to the reaction gas a further substance, preferably a gaseous compound, which forms a non-volatile compound with the less voltatile component of the semiconductor compound, this less volatile component occurring during the transport stage in an excess amount due to the difference in the respective gas pressures of the components. By virtue of the formation of a non-volatile compound binding the excessive amount of less volatile component of the semiconductor compound to be produced, a displacement in composition of the gaseous phase during the transporting operation is minimized or fully prevented.

Preferably employed as a reaction gas in the method according to the invention is a mixture of water vapor and hydrogen, preferably in the molar ratio of 0.1 to 0.3. Added to this reaction gas mixture as a further substance is ammonia. In the production from $A^{III}B^{V}$ compounds, such as gallium arsenide for example, the ammonia reacts with the excessive remainder of gallium and forms gallium nitride which is not volatile and consequently segregates out of the transporting process. The resulting crystals of gallium arsenide thus exhibit an accurately stoichiometric composition.

The addition of ammonia is effected, for example, by providing ammonia in liquid form within a separate evaporator vessel, evaporating the ammonia from the vessel and introducing the vapor into the reaction vessel conjointly with the reaction gas. Another way is to evaporate an aqueous solution of ammonia and adjusting the mixing ratio of the two components of the solution in accordance with the desired water-ammonia ratio of the reaction gas. Still another way of performing the method according to the invention is to employ a solid compound that evolves ammonia when being dissociated, for example ammonium carbamate. This substance is heated in an evaporator vessel up to the dissociation temperature. Furthermore, a gaseous ammonia may be introduced into the reaction vessel just prior to the beginning of the reaction and may be mixed with the reaction gas.

The quantity of the added ammonia depends upon the materials employed as well as upon the length of the transporting distance.

The addition of ammonia in the above-described manner secures the desired advantage not only with transport operations extending over a relatively large distance along a temperature gradient in the reaction vessel, but also with the so-called sandwich epitaxy in which the transportation takes place between two mutually facing surfaces of semiconductor wafers or discs stacked upon each other. The addition of ammonia to the transporting reaction gas, aside from securing attainment of the desired stoichiometry, also provides for improvement toward perfection of the crystals. By virtue of the addition to the reaction gas, it becomes feasible to provide for longer transporting distances between the semiconductor source material and the substrate. This is significant if polycrystalline semiconductor material is used as a source material. Heretofore, the use of polycrystalline material had in most cases the undesired effect of transferring the structure of the source material to the surface of the substrate. The possibility of providing for longer transporting distances between the semiconductor source material and the substrates, afforded by the addition of ammonia, virtually eliminates this disadvantage completely. As a result, semiconductor crystals of extreme crystalline perfection and accurate stoichiometric composition can thus be produced.

The production of doped materials can be effected by adding doping material to the source material or to the reaction gas. Besides, the conventional doping techniques, such as in-alloying or indiffusion of doping material, are applicable. The semiconductor components thus produced are eminently well suitable for the production of electronic semiconductor devices, for example transistors, rectifiers, particularly tunnel diodes, laser diodes and the like. Furthermore, such materials are well suitable for the production of solid state integrated circuits.

Figure 2:
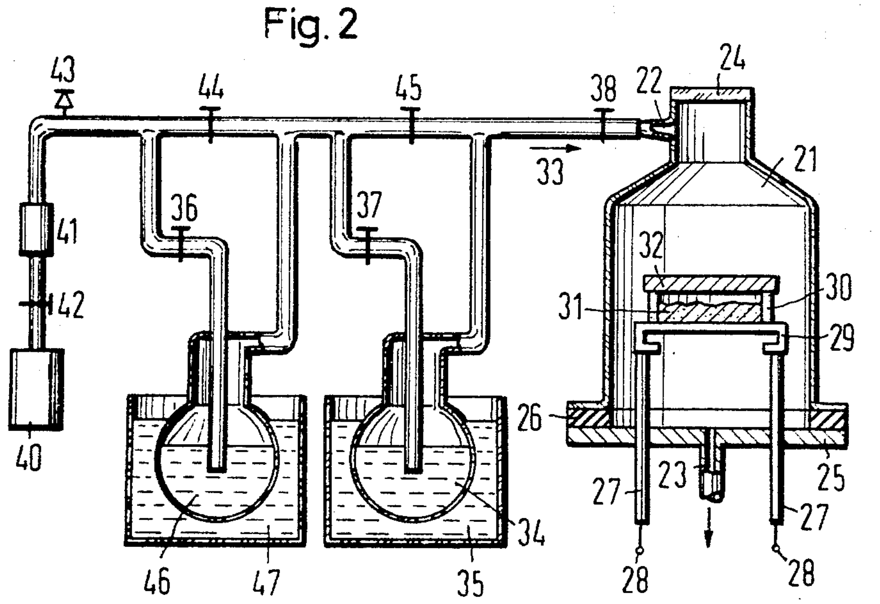

The invention will be further described with reference to the accompanying drawings in which:

FIG. 1 illustrates schematically and partly in section an embodiment of apparatus for performing the method; and FIG. 2 shows schematically and also partly in section, another embodiment of such apparatus.

The apparatus according to FIG. 1 is suitable for producing monocrystalline layers of semiconductor material on substrates. A reaction vessel 1 of quartz accommodates a support 2 on which a number of circular wafers or discs 3 of monocrystalline semiconductor material are placed. The wafers 3 consist of the same semiconductor material as the one to be precipitated. They may also consist of a different semiconductor material if it is of the same crystalline lattice type and has approximately the same lattice constant as the material to be precipitated. For example, substrate discs 3 of germanium may be used for growing thereupon an epitaxial layer of gallium arsenide. In this case the precipitation of the gallium arsenide from the gaseous phase results in the formation of a hetero-junction. Also located in the reaction vessel 1 is a quantity of pulverulent semiconductor source material which, with reference to the example just mentioned, consists of gallium arsenide and is spaced from the substrates 3.

The gas flow through the reaction vessel can be fully or partially closed by valves 5 and 6. The direction of the gas flow through the vessel during performance of the process is indicated by an arrow. The flow velocity on the average is one liter per minute. Employed as reaction gas in the present example is a mixture of steam and hydrogen at a molar ratio of about 0.2. The steam is generated in an evaporator vessel 7 immersed in a temperature bath 8. A valve 9 permits closing the evaporator vessel. During operation, a quantity of hydrogen is passed from a storage tank or bottle 10 through the evaporator vessel 7 and the heated water contained therein. The velocity of the hydrogen flow is measured by a flow meter 11, and controlled with the aid of a valve 12. The hydrogen storage tank is further equipped with an overpressure valve 13. The composition of the reaction gas mixture is adjusted either by regulating the supply of hydrogen with the aid of valve 12 or by regulating the temperature of the heating bath 8.

The third component of the gas, in this case ammonia, is added by thermal dissociation of ammonium carbamate in a quartz flask heated to the dissociation temperature by a heater winding 15 whose terminals 16 are to be attached to a voltage source. The reaction gas mixture entrains some of the ammonia into the reaction vessel 1 and along the semiconductor source material 4.

The reaction vessel 1 is accommodated within a tubular furnace 17 which permits adjusting and regulating different temperature distributions along the furnace axis. For performing the process, the reaction vessel 1 is heated to the reaction temperature. This causes the solid gallium arsenide 4 to react with the water vapor contained in the reaction gas. The reaction occurs in accordance with the equation:

$$2GaAs(s)+H_2O(g)=Ga_2O(g)+H_2+2/xAs_x(g)$$

The parenthetical letters relate to the physical state of the materials: *s* denotes solid, *g* gaseous. The letter *x* indicates the number of the atoms combined within a molecule of arsenic vapor.

The substrate wafers 3 of gallium arsenide on the support 2 are maintained at a lower temperature than the semiconductor source material 4, the temperature difference being about 50° C. The gas mixture formed by the reaction consists of hydrogen, gallium suboxide ($Ga_2O$) and arsenic vapor. This mixture passes from the source material 4 to the substrates 3 where the gallium suboxide reacts with the arsenic vapor and forms gallium arsenide which precipitates upon the substrates so that a monocrystalline layer of gallium arsenide is epitaxially grown upon the monocrystalline gallium arsenide wafers 3. The thickness of the growing layers depends upon the composition of the reaction gas and upon the duration of the precipitation process.

By virtue of the ammonia addition, the excess amount of gallium, occurring on account of the different vapor pressures of gallium and arsenic, cannot reach the substrates. There rather occurs a reaction of gallium and ammonia with the formation of gallium nitride. This substance is virtually non-volatile at the reaction temperature and does not react with steam at the reaction temperature. Consequently, the evolving gallium nitride does not participate in the transport process, and the epitaxial layers growing upon the substrates 3 exhibit a strictly stoichiometric composition. Since hydrogen is present in excess, no gallium oxide, aside from gaseous gallium suboxide, can form and appreciably interfere with the transport process or the formation of gallium arsenide crystals.

If in lieu of gallium arsenide substrates, those of germanium are used, the described method according to the invention results in good hetero-junctions which are desirable for various electronic purposes.

The reaction gas or the semiconductor source material may be given an addition of doping substance. The dopant may either be mixed with the semiconductor source material, or the two materials may be located at different places in the reaction vessel. The latter expedient permits adjusting the dopant concentration as desired by heating the respective localities to different temperatures. This also affords reverse doping for producing p-n junctions.

It is preferable for many purposes to perform the transport reaction not in a flowing medium but between two closely adjacent semiconductor bodies of which one consists of the semiconductor source material and the other of the substrate. Preferably the two semiconductor bodies are placed in direct thermal contact with each other. This sandwich epitaxial technique has considerable advantages in comparison with the flowing-medium process in which the transport must take place over relatively long distances. Above all, the sandwich technique virtually prevents ingress of impurities from the environment and from the vessel material, since the transport takes place only in the narrow interspace between the two semiconductor bodies. Although there obtains the possibility of a gas exchange between the reaction gas in the interspace and the mixture of gases flowing through the surrounding inner space of the reaction vessel, such exchange is limited so that detrimental effects of the environment are almost completely prevented.

The reaction vessel as shown at 21 in FIG. 2 is particularly well suitable for the sandwich technique. The vessel has an inlet opening 22 near the top and a gas outlet 23 in the bottom. A quartz plate 24 ground to planar shape closes the neck-shaped top of the vessel and permits pyrometrically observing the substrate temperature. The reaction vessel is seated upon a base plate 25 and sealed by a gasket ring 26. Current supply conductors 27 traverse the base plate 25 and are insulated and sealed relative thereto. The terminals 28 of the conductors 27 are to be connected to a voltage source. The conductors 27 lead to a heating table 29 upon which a ring-shaped spacer 30 is placed around semiconductor source material 31 of pulverulent form or shaped to a compressed tablet. Suitable semiconductor materials, for example, are gallium arsenide, gallium phosphide, indium arsenide, indium phosphide, and other semiconductor compounds. Placed on top of the spacer ring 30 is a circular disc 32 of the same semiconductor material to serve as the substrate.

The reaction gas enters into the reaction vessel through the inlet 22 as indicated by an arrow 33. Employed as reaction gas is the mixture of steam, hydrogen and ammonia described in the foregoing. An evaporator vessel 34 mounted in a temperature bath 35 serves to generate the required steam. Hydrogen is supplied from a storage tank or bottle 40. The flow velocity of the hydrogen is measured with the aid of a flow meter 41. A valve 42 permits adjusting the desired flow velocity. The hydrogen supply is further connected to an overpressure safety valve 43. By properly setting additional valves 43 and 45, the supply of hydrogen to the evaporator vessels 34 and 46 can be properly adjusted and regulated. Further valves 36 and 37 permit a corresponding control of the flow of steam. The evaporator vessel 46 contains an aqueous solution of ammonia, preferably of 25% concentration, and is kept at the required vaporization temperature by means of the appertaining temperature bath 47. By adjusting the evaporation temperatures in the respective baths 35 and 47, as well as by operation of the valves 36, 37 and 42, the composition and flow velocity of the reaction gas can be controlled in any desired manner. Furthermore, the valve 38 permits the supply of reaction gas to the reaction vessel 21 to be entirely or partially shut off.

The reaction gas, preferably containing about 25% by volume of ammonia, passes into the reaction vessel 21 and enters into the space between the semiconductor source material 31 and the substrate disc 32. A conversion takes place between the gallium arsenide, present in pulverulent form, and the water vapor. This results in the formation of gaseous gallium suboxide and arsenic vapor. The hydrogen contained in the reaction gas prevents the formation of higher gallium oxides. The gas mixture reaches the bottom side of the substrate 32, heated to a temperature of about 1100° C., where the gallium suboxide reacts with the arsenic vapor and forms gallium arsenide which grows in monocrystalline constitution on the bottom side of the substrate disc. A shift in the stoichiometric composition of the gallium arsenide during the transport process is prevented by the presence of ammonia which forms non-volatile gallium nitride together with the evolving excess amount of gallium.

The addition of ammonia to the reaction gas is particularly advantageous when employing pulverulent source material, since such addition permits lengthening the transport distance without incurring any detriment. As a result, the use of pulverulent source material remains satisfactory if the "pattern" caused thereby is not to be transferred to the layer growing on the substrate disc.

Epitaxially grown layers or thin films of gallium arsenide produced according to the invention are distinct by strict stoichiometry, as well as by extremely high purity, and are therefore particularly well suitable for the exacting requirements of the semiconductor techniques, for example the production of transistors, rectifiers and other semiconductor devices. The doping of the grown layers can then be readily carried out by any one of the methods known for such purposes. As explained, however, the type of conductivity or resistivity of the grown layer may also be determined from the outset by adding doping substances to the reaction gas. As also explained, the method of the invention is analogously applicable to the production of epitaxial layers and thin films of other semiconductor compounds, particularly binary compounds in which one of the elemental components has a vapor pressure greatly different from that of the other. This applies particularly to semiconducting phosphides.

We claim:

1. In the method of growing epitaxial layers of stoichiometrically composed semiconductor compounds, whose components have respectively different vapor pressures, by a chemical transport reaction comprising the steps of subjecting solid semiconductor source material at one locality in a reaction vessel to a reaction gas for converting the source material to the gaseous state and transporting it with the reaction gas to a substrate situated at a different vessel locality heated to a temperature different from that of said one locality so as to precipitate the semiconductor compound upon the substrate, the improvement which comprises adding to the reaction gas ammonia which forms a non-volatile compound with the less volatile one of the components of said semiconductor compound, whereby said added substance binds the excess amount of said one component evolving, due to the difference in vapor pressures, from the transport reaction.

2. The method according to claim 1, wherein said semiconductor compound is a binary $A^{III}B^{V}$ compound.

3. The method according to claim 1, wherein said semiconductor compound is a binary compound of indium or gallium with arsenic or phosphorus.

4. The method according to claim 1, wherein said reaction gas is a mixture of water vapor and hydrogen.

5. The method according to claim 1 wherein said reaction gas is a mixture of water vapor and hydrogen in the molar ratio of 0.1 to 0.3.

6. The method according to claim 4, which comprises supplying ammonia in liquid form, evaporating it in a separate evaporator, and introducing the vapor together with the reaction gas into the reaction vessel.

7. The method according to claim 4, which comprises supplying ammonia as an aqueous solution, evaporating ammonia and water from the solution, and joining the vapors with the reaction gas.

8. The method according to claim 4, which comprises supplying ammonia in form of a solid compound from which gaseous ammonia is dissociable, heating the solid compound in an evaporator, and joining the evolving ammonia vapor with the reaction gas.

9. The method according to claim 8, wherein said solid compound is ammonium carbamate.

10. The method according to claim 1, which comprises performing the transport reaction within a flow of the reaction gas and said source locality being at a higher temperature than said substrate locality.

11. The method according to claim 1, wherein said source material and said substrate are placed in proximity to each other.

12. The method according to claim 1, wherein said source material and said substrate are placed one on top of the other.

13. The method according to claim 12, wherein said source material is tablet shaped.

14. The method according to claim 1, wherein said source material is pulverulent.

15. The method according to claim 1, wherein said substrate is formed of a monocrystalline wafer consisting of the same semiconductor material as the one being precipitated.

16. The method according to claim 1, wherein said substrate is formed of monocrystalline wafer consisting of a semiconductor material different from the one being precipitated so that a hetero-junction is produced.

17. The method according to claim 16, wherein said source material is an $A^{III}B^{V}$ semiconductor compound, and said substrate consists of germanium.

References Cited

UNITED STATES PATENTS

| | | | |
|---|---|---|---|
| 3,142,596 | 7/1964 | Theuerer | 148—175 |
| 3,197,411 | 7/1965 | Frosch | 148—175 XR |
| 3,291,657 | 12/1966 | Sirtl | 148—175 |
| 3,322,501 | 5/1967 | Woodall | 148—116 XR |
| 3,397,094 | 8/1968 | Webb | 148—174 |

L. DEWAYNE RUTLEDGE, Primary Examiner

PAUL WEINSTEIN, Assistant Examiner

U.S. Cl. X.R.

23—204; 117—106, 107; 148—1, 174; 252—62